(12) United States Patent
Meyer et al.

(10) Patent No.: US 9,002,150 B2
(45) Date of Patent: Apr. 7, 2015

(54) OPTICAL SENSING SYSTEM AND METHOD

(75) Inventors: Timothy S. Meyer, Greensboro, NC (US); Michael D. Holt, Elon, NC (US); Richard T. Kane, Summerfield, NC (US); Kenneth B. Tysinger, Burlington, NC (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 280 days.

(21) Appl. No.: 13/466,335

(22) Filed: May 8, 2012

(65) Prior Publication Data

US 2013/0301978 A1 Nov. 14, 2013

(51) Int. Cl.
*G02B 6/00* (2006.01)
*G01D 5/353* (2006.01)
*G01K 11/32* (2006.01)

(52) U.S. Cl.
CPC ............ *G01D 5/35358* (2013.01); *G01K 11/32* (2013.01)

(58) Field of Classification Search
CPC ................. G01N 2021/1742; G01N 2021/65; G01N 2021/655
USPC ...................................................... 385/12, 13
See application file for complete search history.

(56) References Cited

U.S. PATENT DOCUMENTS

| 4,723,316 A | 2/1988 | Glance |
| 5,060,312 A | 10/1991 | Delavaux |
| 5,082,368 A | 1/1992 | Fuchs et al. |
| 5,206,924 A | 4/1993 | Kersey |
| 5,396,365 A | 3/1995 | Gustavsson |
| 6,256,432 B1 | 7/2001 | Jeon et al. |
| 6,380,534 B1 | 4/2002 | Farhadiroushan et al. |
| 6,466,706 B1 * | 10/2002 | Go et al. ......................... 385/12 |
| 6,476,919 B1 | 11/2002 | Mori et al. |
| 6,785,004 B2 * | 8/2004 | Kersey et al. ................. 356/478 |
| 7,173,690 B2 | 2/2007 | Haran |
| 7,199,870 B2 | 4/2007 | Andrekson et al. |
| 7,284,903 B2 | 10/2007 | Hartog |
| 7,336,365 B2 | 2/2008 | Waagaard et al. |
| 7,652,245 B2 * | 1/2010 | Crickmore et al. ...... 250/227.12 |
| 7,719,666 B2 | 5/2010 | Kishida et al. |
| 7,873,273 B2 * | 1/2011 | Koyamada ..................... 398/28 |
| 2006/0210269 A1 * | 9/2006 | Farhadiroushan et al. ..... 398/48 |

(Continued)

FOREIGN PATENT DOCUMENTS

| EP | 1912049 A1 | 4/2008 |
| GB | 2222247 A | 2/1990 |

OTHER PUBLICATIONS

Giallorenzi, Thomas G., "Optical Fiber Sensor Technology," Journal of Quantum Electronics, vol. QE-18, No. 4, (Apr. 1982).

*Primary Examiner* — Rhonda Peace
(74) *Attorney, Agent, or Firm* — Ingrassia, Fisher & Lorenz, P.C.

(57) ABSTRACT

An optical sensing system includes a transmitter assembly for generating a generated signal having a frequency in an optical wavelength. An optical sensing fiber is coupled to the transmitter assembly for receiving the generated signal and producing a reflected signal from backscattering of the generated signal. The system also includes a receiver assembly coupled to the optical sensing fiber for receiving the reflected signal. The system further includes a controller in communication with the receiver assembly for determining environmental effects imposed on the optical sensing fiber based on characteristics of the reflected signal.

19 Claims, 2 Drawing Sheets

(56) References Cited

U.S. PATENT DOCUMENTS

Figure 1:
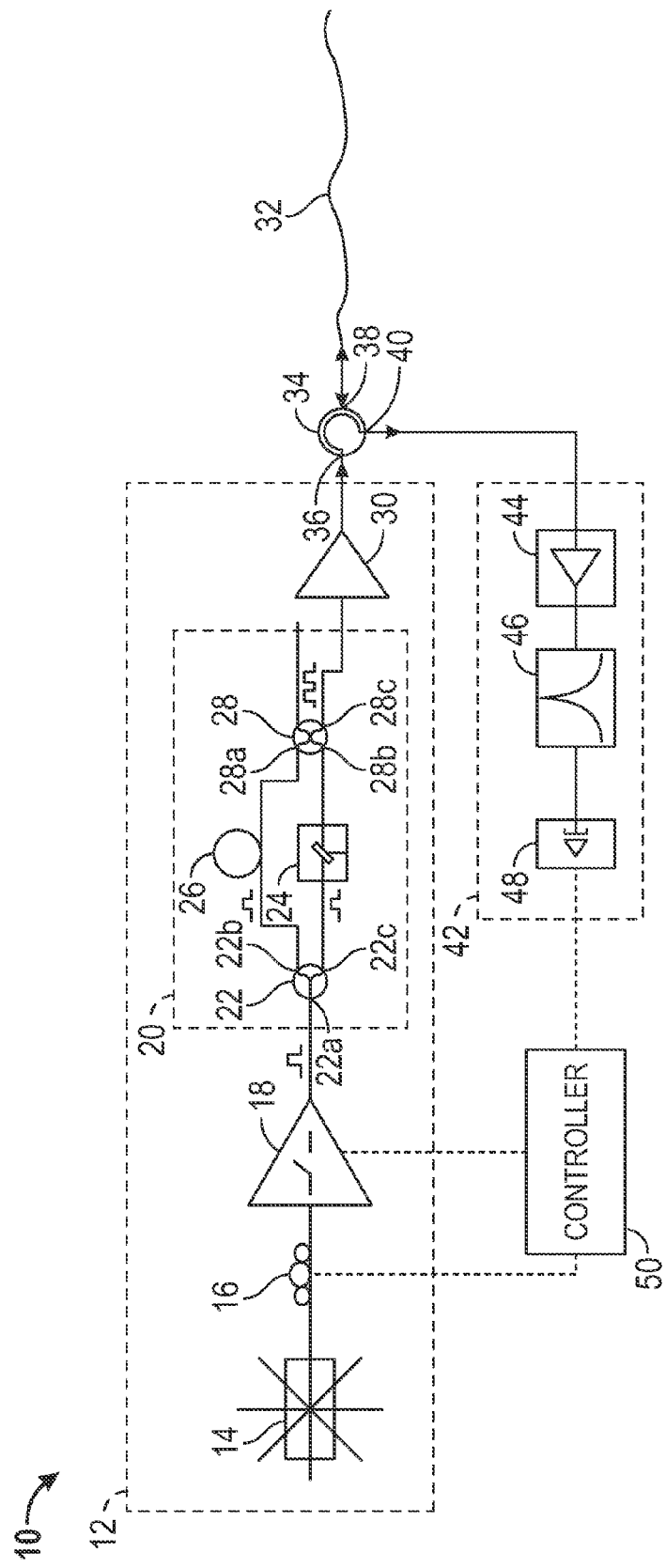

| | | | |
|---|---|---|---|
| 2007/0024857 A1* | 2/2007 | Menezo | 356/478 |
| 2008/0145049 A1* | 6/2008 | Koyamada | 398/28 |
| 2008/0277568 A1* | 11/2008 | Crickmore et al. | 250/227.12 |
| 2008/0278711 A1* | 11/2008 | Sikora et al. | 356/73.1 |
| 2008/0297772 A1* | 12/2008 | Rogers et al. | 356/73.1 |
| 2009/0263069 A1* | 10/2009 | Hartog | 385/12 |
| 2011/0220776 A1* | 9/2011 | Abedin et al. | 250/205 |
| 2013/0222811 A1* | 8/2013 | Handerek | 356/477 |
| 2013/0301978 A1* | 11/2013 | Meyer et al. | 385/12 |

* cited by examiner

OPTICAL SENSING SYSTEM AND METHOD

BACKGROUND OF THE INVENTION

1. Field of the Invention

The invention relates generally to optical sensing systems and methods.

2. Description of the Related Art

Some optical sensing systems rely on Raleigh scattering that occurs in an optical sensing fiber. Typically, these systems utilize hardware to segregate return signals into multiple paths based on their polarization characteristics. Each path is processed independently and the signals with the best polarization characteristics are selected during processing.

Unfortunately, such sensing systems suffer from high hardware costs for implementing multiple receiver paths. Moreover, the maximum length of the optical sensing fiber is typically limited to less than 5 km.

Accordingly, it is desirable to provide an optical sensing system and method that does not require multiple receiver paths. It is also desirable to provide an optical sensing system and method that can allow optical sensing fiber having a length over 5 km. Furthermore, other desirable features and characteristics of the present invention will become apparent from the subsequent detailed description of the invention and the appended claims, taken in conjunction with the accompanying drawings and this

BACKGROUND OF THE INVENTION

BRIEF SUMMARY

An optical sensing system includes a transmitter assembly for generating a generated signal having a frequency in an optical wavelength. An optical sensing fiber is coupled to the transmitter assembly for receiving the generated signal and producing a reflected signal from backscattering of the generated signal. The system also includes a receiver assembly coupled to the optical sensing fiber for receiving the reflected signal. The system further includes a controller in communication with the receiver assembly for determining environmental effects imposed on the optical sensing fiber based on characteristics of the reflected signal.

A method includes generating a generated signal having a frequency in an optical wavelength. The method also includes sending the generated signal to an optical sensing fiber which produces a reflected signal from backscattering of the generated signal. The method further includes receiving the reflected signal at a receiver assembly coupled to the optical sensing fiber. The method also includes determining environmental effects imposed on the optical sensing fiber based on characteristics of the reflected signal with a controller in communication with the receiver assembly.

BRIEF DESCRIPTION OF THE DRAWINGS

Other advantages of the disclosed subject matter will be readily appreciated, as the same becomes better understood by reference to the following detailed description when considered in connection with the accompanying drawings wherein:

FIG. 1 is a block diagram of a first embodiment of a sensing system including a transmitter assembly, an optical sensing fiber, a receiver assembly, and a controller; and FIG. 2 is a block diagram of a second embodiment of the sensing system including the transmitter assembly, a Raman pump laser, the optical sensing fiber, the receiver assembly, and the controller.

DETAILED DESCRIPTION

Referring to the Figures, wherein like numerals indicate like parts throughout the several views, an optical sensing system 10 and method of sensing are shown herein.

Referring to FIG. 1, the sensing system 10 includes a transmitter assembly 12 for generating a signal having a frequency in an optical wavelength. That is, the signal generated by the transmitter assembly is a wave of light. The signal generated by the transmitter assembly will be referred to as the "generated signal" herein, to distinguish this signal from other signals.

In a first embodiment of the system 10, as shown in FIG. 1, the transmitter assembly 12 includes a laser 14 for emitting light. Specifically, the laser 14 of the first embodiment is a narrow line-width laser that achieves light emissions in a narrow bandwidth of optical frequencies. Furthermore, the light produced by the laser 14 of the first embodiment is polarized. Moreover, the laser 14 produces the light in a steady state, i.e., the light produced by the laser 14 does not significantly vary over time. In short, the laser 14 of the first embodiment is a narrow line-width laser that creates a polarized, steady state output.

The transmitter assembly 12 of the first embodiment further includes a polarization manipulator 16. The polarization manipulator 16 is in optical communication with the laser 14. That is, the laser 14 and the polarization manipulator 16 are connected, e.g., with an optical fiber (not numbered) or other suitable waveguide (not shown). (Other instances of "optical communication" described herein may also be accomplished with the optical fiber or other suitable waveguide, as is well understood by those skilled in the art.) The polarization manipulator 16 receives the light from the laser 14 and varies the polarization of the light. The polarization manipulator 16 may produce different polarizations of the light at different times, as discussed in further detail below.

The transmitter assembly 12 of the first embodiment also includes a pulse generator 18. The pulse generator 18 is in optical communication with the laser 14 for receiving the light. Specifically, in the first embodiment, the pulse generator 18 is in optical communication with the polarization manipulator 16 for receiving the light.

In the first embodiment, the pulse generator 18 is implemented with a semiconductor optical amplifier. However, those skilled in the art will appreciate other devices and/or techniques to implement the pulse generator 18. The pulse generator 18 generates an optical pulse from the light. That is, the pulse generator 18 takes the steady state optical signal and generates at least one discrete pulse. Specifically, in the first embodiment, the semiconductor optical amplifier implemented as the pulse generator 18 acts as a shutter to generate the at least one discrete pulse. Although the pulse generator 18 may generate a plurality of optical pulses over time, for purposes of clarity, the system 10 will be described immediately below as if the pulse generator 18 only produces one optical pulse.

The transmitter assembly 12 of the first embodiment also includes a compensator device 20. The compensator device 20 is in optical communication with the pulse generator 18 for receiving the optical pulse generated by the pulse generator 18. The compensator device 20 splits the optical pulse into a first optical pulse and a second optical pulse. The second optical pulse is delayed relative to the first optical pulse.

More specifically, in the first embodiment, the compensator device 20 includes a coupler 22 for splitting the optical pulse into the first optical pulse and the second optical pulse. As such, the coupler 22 may alternately be referred to as a "splitter" or a "pulse divider". The coupler 22 includes an input 22a in optical communication with the pulse generator 18, a first output 22b, and a second output 22c. As such, the first optical pulse is provided at the first output and the second optical pulse is provided at the second output.

The compensator device 20 further includes an optical modulator 24 for shifting the frequency of first optical pulse. The optical modulator 24 is in optical communication with the splitter 22. More specifically, in the first embodiment, the optical modulator 24 is in optical communication with the first output of the splitter 22. Furthermore, in the first embodiment, the optical modulator is an acousto-optic modulator. However, in other embodiments, some other type of optical modulator may alternatively be implemented in order to shift the frequency of the first optical pulse.

The compensator device 20 also includes a delay path 26 for delaying the second pulse relative to the first pulse. The delay path 26 is in optical communication with the splitter 22. More specifically, in the first embodiment, the delay path 26 is in optical communication with the second output of the splitter 22. In the first embodiment, the delay path 26 is implemented as a length of optical fiber that is much longer than the path provided by the optical modulator 24. As such, the second optical pulse is delayed relative to the first optical pulse as the second optical pulse must travel through a much longer optical path than the first optical pulse.

The compensator device 20 further includes a coupler 28 for combining the first optical pulse and the second optical pulse into the generated signal. The coupler 28 is in optical communication with both the optical modulator 24 and the delay path 26. More specifically, the coupler 28 includes a first input 28b in optical communication with the optical modulator 24 and a second input 28a in optical communication with the delay path 26. The coupler 28 also includes at least one output 28c.

The transmitter assembly 12 of the first embodiment further includes an optical amplifier 30 to amplify the first and second pulses of the generated signal. The optical amplifier 30 is in optical communication with the compensator device 20. That is, the optical amplifier 30 increases the intensity of the light of the generated signal. Those skilled in the art will appreciate numerous devices and/or configurations which would be suitable to implement the amplifier 30. The amplifier 30 includes an input (not numbered) and at least one output (not numbered).

The system 10 further includes an optical sensing fiber 32 in optical communication with the transmitter assembly 12. The optical sensing fiber 32 receives the generated signal from the transmitter assembly 12. In the illustrated embodiments, the optical sensing fiber 32 is implemented with a single-mode optical fiber ("SMF").

In the first embodiment, a circulator 34 optically couples the transmitter assembly 12 to the optical sensing fiber 32. More specifically, the circulator 34 includes a first port 36, a second port 38, and a third port 40. The first port 36 is optically coupled to the output of the amplifier 30 to receive the generated signal. The optical sensing fiber 32 is optically connected to the second port 36. The circulator 34 transfers the generated signal from the first port 36 to the second port 38, and therefore, to the optical sensing fiber 32.

The optical sensing fiber 32 produces a reflected signal from backscattering of the generated signal. The backscattering occurs due to inherent imperfections in the optical sensing fiber 32. More specifically, Rayleigh scattering will reflect the generated signal back to the circulator 34 in the form of the reflected signal. The reflected signal will include an accumulated phase modulation imposed on the first optical pulse and the second optical pulse as the optical pulses travel through the optical sensing fiber 32 in the forward and reverse directions. The accumulated phase modulation includes a common mode signal that is representative of the length of sensor fiber that was traveled by both the first pulse and the second pulse. A differential phase modulation is also imparted on the first pulse, as it travels in the forward and reverse directions through a section of the sensing fiber 32 that was not traveled by the second pulse. This differential phase modulation is representative of the measurand imposed on the section of sensing fiber 32 not traveled by the second pulse.

The system 10 also includes a receiver assembly 42 in optical communication with the optical sensing fiber 32 for receiving the reflected signal. In the first embodiment, the receiver assembly 42 is optically connected to the third port 40 of the circulator 34. The reflected signal enters the second port 38 of the circulator and is transferred to the third port 40, and therefore, to the receiver assembly 42.

The receiver assembly 42 of the first embodiment includes an optical amplifier 44 to amplify the reflected signal. That is, the optical amplifier 44 increases the intensity of the light of the reflected signal. Those skilled in the art will appreciate numerous devices and/or configurations which would be suitable to implement the amplifier 44. The amplifier 44 includes an input (not numbered) and at least one output (not numbered). More specifically, the input of the amplifier 44 of the first embodiment is optically connected to the third port 40 of the circulator 34.

The receiver assembly 42 of the first embodiment further includes a filter 46 in optical communication with the amplifier 44. The filter 46 removes undesired and/or extraneous noise from the reflected signal. More specifically, the filter 46 only allows certain frequencies of light of the reflected signal to pass therethrough. Those skilled in the art will appreciate numerous devices and/or configurations which would be suitable to implement the filter 46. The filter 46 includes an input (not numbered) and at least one output (not numbered). More specifically, in the first embodiment, the input of the filter 46 is optically connected to the output of the amplifier 44.

The receiver assembly 42 further includes a photo detector 48. The photo detector 48 receives the light of the reflected signal and converts the reflected signal to an electrical signal. Those skilled in the art will appreciate numerous devices and/or configurations which would be suitable to implement the photo detector 48. The photo detector 48 includes an input (not numbered) and at least one output (not numbered). More specifically, in the first embodiment, the input of the photo detector 48 is optically connected to the output of the filter 46.

Notably, to achieve a high visibility by the receiver assembly, it is preferred that polarization of the first optical pulse and the polarization of the second optical pulses of the reflected signal are aligned. Polarization misalignment between the first and second optical pulses will result in lower amplitude signals at the output of the photo detector 48 and may render the reflected signal unrecoverable.

The system 10 also includes a controller 50. The controller 50 may be a microprocessor, a microcontroller, an application specific integrated circuit ("ASIC"), or other logic device for performing computations and/or executing instructions. The controller 50 is in communication with the receiver assembly 42. More specifically, in the first embodiment, the controller 50 is electrically connected to the photo detector 48 to receive the electrical signal produced by the photo detector 48.

The controller 50 utilizes the electrical signal to determine various environmental effects imposed on the optical sensing fiber 32. That is, the controller 50 may determine various environmental effects, or "measurands", imposed on the optical sensing fiber 32 based on characteristics of the reflected signal. For instance, these environmental effects may include a temperature or a pressure of the optical sensing fiber 32. These environmental effects are realized when the optical sensing fiber 32 is stretched and/or compressed in some manner by the measurand. Specifically, when the optical sensing fiber 32 is stretched or compressed, the length of the optical path is changed, resulting in the modulation of the generated signal and the reflected signal.

The electrical signal received at the controller 50 is the result of the interference of the first and second optical pulses reflected from different points in the sensing fiber 32, such that they arrive coincident as the reflected signal. Specifically, the frequency modulation imposed in the compensator assembly and the accumulated phase difference between the pulses will be present in the electrical signal. The measurement of this accumulated phase difference resulting from the optical path-length difference between the first and second pulse is utilized to determine the environmental effects imposed on the optical sensing fiber 32.

Various techniques may be utilized to achieve and/or enhance the detection of various environmental effects by the system 10. For instance, the optical sensing fiber 32 may be wound about a mandrel to effectively increase the amount of sensing fiber 32 within a given volume to increase sensitivity to the measurand. The strain provided by the measurand interacting with the windings of the optical sensing fiber 32 modulates the phase of the generated signal and the reflected signal. In another example, the optical sensing fiber 32 may be coated with materials (e.g., Metglas or metals) or the mandrel may be made of a magneto-restrictive material to allow the optical sensing fiber to become sensitive to magnetic fields.

The controller 50 of the first embodiment is also in communication with the polarization manipulator 16 to control the variation of polarization that is applied to the light. The controller 50 of the first embodiment is also in communication with the pulse generator 18 to control the actuation of the pulse generator 18 and, thus, the timing of when pulses are generated by the pulse generator 18.

In operation of the system 10, the polarization of the light is varied periodically. For instance, once the first and second optical pulses have arrived at the receiver assembly 42 and transmitted to the controller 50 in the form of the electrical signal, the controller 50 will change the polarization that is applied to the light. After the polarization has been changed, the pulse generator 18, controlled by the controller 50, will generate two additional optical pulses, i.e., a third optical pulse and a fourth optical pulse. As these third and fourth optical pulses have a different polarization from the first and second optical pulses, a new pattern of Rayleigh scattering in the optical sensing fiber 32 will occur. As such, different regions of the optical sensing fiber 32 may be "visible" to the receiver assembly 42 in the reflected signal that may not have been visible with the first and second optical pulses. This process may be repeated with each pair of optical pulses being transmitted at a different state of polarization, such that phase modulation along the entire length of the optical sensing fiber 32 is visible and received by the receiver assembly 42.

Figure 2:
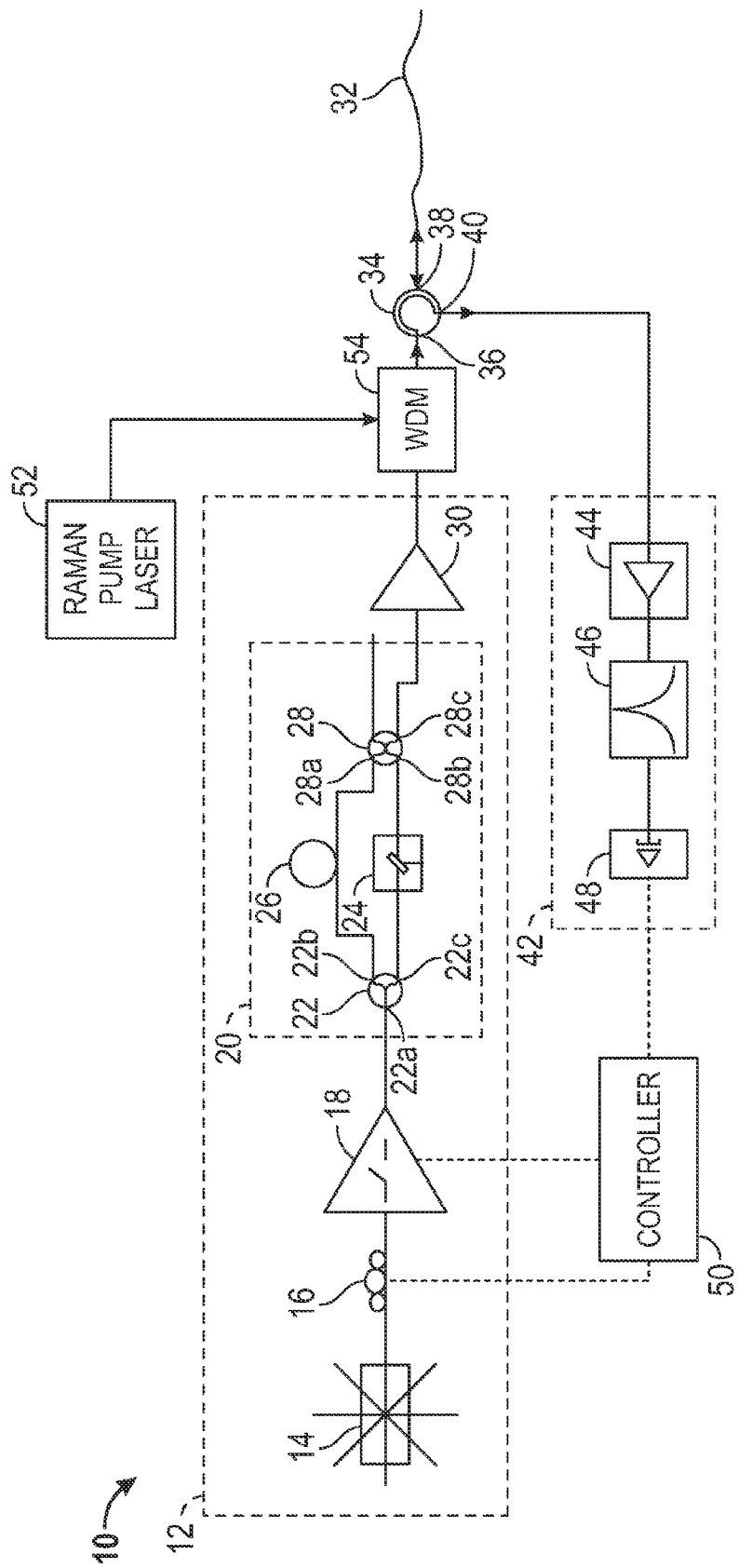

A second embodiment of the system 10 is shown in FIG. 2. This second embodiment includes each of the elements described above with respect to the first embodiment. In addition, the second embodiment of the system 10 includes a Raman pump laser 52 and a wavelength division multiplexer 54. The Raman pump laser 52 generates an optical signal, i.e., light, herein referred to as the Raman pump. Those skilled in the art appreciate that a sufficient amount of Raman pump power interacting with the signal results in the coherent coupling of the pump and signal photons, whereby the pump photon is annihilated and the signal photons are increased with the release of optical photons.

The Raman pump laser 52 and the wavelength division multiplexer 54 are in optical communication with each other such that the wavelength division multiplexer 54 receives the Raman signal. The wavelength division multiplexer 54 is disposed between the transmitter assembly 12 and the circulator 34. More specifically, the wavelength division multiplexer 54 receives the generated signal from the output of the amplifier 30. The wavelength division multiplexer allows the generated signal and the Raman signal to co-propagate to the optical sensing fiber 32. In practice, the wavelength of the Raman signal is selected such that a peak of the Raman gain spectrum is aligned with the wavelength of the optical pulses of the generated signal (typically around 90 nm spacing in SMF).

Co-propagation of the generated and Raman signals results in distributed gain to the optical pulses as they travel away from the transmitter assembly 12. As such, when Rayleigh scattering occurs, the signal power is increased as it propagates in the fiber 32 and the reflected signal will have a higher amplitude than the reflected signal of the first embodiment. Consequently, the amplification provided by the Raman pump laser 52 allows much longer lengths of the optical sensing fiber 32 to be utilized than in prior art sensing systems (Typically, in a SMF for first order pumping, the interaction length is approximately 15-20 km). For instance, in prior art systems, the maximum length (i.e., the range) of the optical sensing fiber is typically around 5 km. However, in the system 10 of the second embodiment, the maximum length of the optical sensing fiber 32 may greater than 30 km with sufficient pump power and a suitable optical fiber.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:
1. An optical sensing system comprising:
a transmitter assembly configured to generate a generated signal having a frequency in an optical wavelength and to transmit the generated signal to an optical sensing fiber;
a Raman pump laser configured to generate a Raman signal in an optical wavelength;
a wave length division multiplexer disposed between said transmitter assembly and the optical sensing fiber and in optical communication with said Raman pump laser and said transmitter assembly, said wave length division multiplexer configured to allow the Raman signal to co-propagate with the generated signal through the optical sensing fiber;

a receiver assembly coupled to the optical sensing fiber, the receiver assembly configured to receive a reflected signal produced by backscattering of the generated signal; and a controller in communication with said receiver assembly, the controller configured to determine environmental effects imposed on the optical sensing fiber based on characteristics of the reflected signal.

2. A system as set forth in claim 1 wherein said transmitter assembly includes a laser for emitting light.

3. A system as set forth in claim 2 wherein said transmitter assembly includes a polarization manipulator in communication with said laser, said polarization manipulator configured to receive the light and vary the polarization of the light.

4. A system as set forth in claim 2 wherein said transmitter assembly includes a pulse generator in communication with said laser, said pulse generator configured to receive the light and generate an optical pulse from the light.

5. A system as set forth in claim 4 wherein said transmitter assembly includes a compensator device in communication with said pulse generator for receiving the optical pulse and splitting the optical pulse into a first optical pulse and a second optical pulse delayed relative to the first optical pulse.

6. A system as set forth in claim 5 wherein said compensator device includes a splitter configured to split the optical pulse into the first optical pulse and the second optical pulse.

7. A system as set forth in claim 6 wherein said compensator device includes an optical modulator configured to shift the frequency of first optical pulse.

8. A system as set forth in claim 6 wherein said compensator device includes a delay path configured to delay the second pulse relative to the first pulse.

9. A system as set forth in claim 8 wherein said compensator device includes a joiner configured to join the first and second optical pulses into the generated signal.

10. A system as set forth in claim 1 further comprising a circulator optically connecting said transmitter assembly, the optical sensing fiber, and said receiver assembly such that the generated signal is transferred from said transmitter assembly to the optical sensing fiber and the reflected signal is transferred from the optical sensing fiber to said receiver assembly.

11. A system as set forth in claim 1 wherein a wavelength of the Raman signal is at a peak of the Raman gain spectrum and aligned with the wavelength of the generated signal.

12. A method comprising:
generating a generated signal having a frequency in an optical wavelength;
generating a Raman signal in an optical wavelength;
co-propagating the generated signal and the Raman signal to an optical sensing fiber which produces a reflected signal from backscattering of the generated signal;
receiving the reflected signal at a receiver assembly coupled to the optical sensing fiber; and
determining environmental effects imposed on the optical sensing fiber based on characteristics of the reflected signal with a controller in communication with the receiver assembly.

13. A method as set forth in claim 12 wherein generating a generated signal further comprises emitting light with a laser.

14. A method as set forth in claim 13 wherein generating a generated signal further comprises generating an optical pulse from the light.

15. A method as set forth in claim 14 wherein generating a generated signal further comprises splitting the optical pulse into a first optical pulse and a second optical pulse.

16. A method as set forth in claim 15 wherein generating a generated signal further comprises shifting the frequency of the first optical pulse.

17. A method as set forth in claim 16 wherein generating a generated signal further comprises delaying the second pulse relative to the first pulse.

18. A method as set forth in claim 17 wherein generating a generated signal further comprises joining the first and second optical pulses into the generated signal.

19. An optical sensing system comprising:
a transmitter assembly comprising
a laser configured to generate a generated signal having a frequency in an optical wavelength,
a polarization manipulator in communication with said laser,
a pulse generator in communication with said laser, said pulse generator configured to receive the generated signal and generate an optical pulse from the generated signal, and
a compensator device in communication with said pulse generator for receiving the optical pulse and splitting the optical pulse into a first optical pulse and a second optical pulse delayed relative to the first optical pulse;
an optical sensing fiber coupled to said transmitter assembly for receiving the generated signal and producing a reflected signal from backscattering of the generated signal;
said polarization manipulator configured to receive the generated signal and vary the polarization of the generated signal such that the polarization of the first optical pulse and the second optical pulse of the reflected signal are aligned;
a receiver assembly coupled to said optical sensing fiber, the receiver assembly configured to receive the reflected signal; and
a controller in communication with said receiver assembly, the controller configured to determine environmental effects imposed on said optical sensing fiber based on characteristics of the reflected signal.

* * * * *